United States Patent
Horesh et al.

(10) Patent No.: US 11,763,180 B2
(45) Date of Patent: Sep. 19, 2023

(54) UNSUPERVISED COMPETITION-BASED ENCODING

(71) Applicant: Intuit Inc., Mountain View, CA (US)

(72) Inventors: Yair Horesh, Kfar Sava (IL); Daniel Ben David, Hod Hasharon (IL); Yehezkel Shraga Resheff, Tel Aviv (IL)

(73) Assignee: Intuit Inc., Mountain View, CA (US)

(*) Notice: Subject to any disclaimer, the term of this patent is extended or adjusted under 35 U.S.C. 154(b) by 398 days.

(21) Appl. No.: 16/941,250

(22) Filed: Jul. 28, 2020

(65) Prior Publication Data
US 2022/0036209 A1    Feb. 3, 2022

(51) Int. Cl.
*G06Q 30/00*    (2023.01)
*G06N 5/04*    (2023.01)
*G06Q 40/12*    (2023.01)
*G06N 20/00*    (2019.01)

(52) U.S. Cl.
CPC ........... *G06N 5/04* (2013.01); *G06N 20/00* (2019.01); *G06Q 40/12* (2013.12)

(58) Field of Classification Search
None
See application file for complete search history.

(56) References Cited

U.S. PATENT DOCUMENTS

| | | | |
|---|---|---|---|
| 2001/0013035 A1* | 8/2001 | Cohen | G06F 16/256 707/999.005 |
| 2009/0132385 A1* | 5/2009 | Inoue | G06Q 30/0601 705/26.1 |
| 2016/0179945 A1* | 6/2016 | Lastra Diaz | G06F 16/284 707/739 |
| 2017/0286835 A1* | 10/2017 | Ho | G06F 40/247 |
| 2019/0129701 A1* | 5/2019 | Hawrylo | G06F 8/60 |
| 2019/0129732 A1* | 5/2019 | Sivertson | G06N 7/01 |
| 2019/0318407 A1* | 10/2019 | Giridhari | G06Q 30/0627 |

OTHER PUBLICATIONS

Agarwal, K., "RAKE: Rapid Automatic Keyword Extraction Algorithm", https://medium.com/datadriveninvestor/rake-rapid-automatic-keyword-extraction-algorithm-f4ec17b2886c, Apr. 8, 2020, 5 pages.

* cited by examiner

*Primary Examiner* — Matthew T Sittner
(74) *Attorney, Agent, or Firm* — Ferguson Braswell Fraser Kubasta PC

(57) ABSTRACT

A method collects word-based data corresponding to a first identifier. A first phrase vector is generated for the first identifier by extracting frequency data from the word-based data. A similarity metric is generated corresponding to the first identifier and a second identifier by comparing the first phrase vector of the first identifier to a second phrase vector of the second identifier. A tuple is generated that includes the first identifier and the second identifier using the similarity metric. A machine learning model is trained with the tuple to generate an embedded vector corresponding to the first identifier.

19 Claims, 7 Drawing Sheets

UNSUPERVISED COMPETITION-BASED ENCODING

BACKGROUND

Entities (e.g., small businesses) generate voluminous amounts of records using word-based data. A challenge is to identify similar entities from word-based data.

SUMMARY

In general, in one or more aspects, the disclosure relates to a method that collects word-based data corresponding to a first identifier. A first phrase vector is generated for the first identifier by extracting frequency data from the word-based data. A similarity metric is generated corresponding to the first identifier and a second identifier by comparing the first phrase vector of the first identifier to a second phrase vector of the second identifier. A tuple is generated that includes the first identifier and the second identifier using the similarity metric. A machine learning model is trained with the tuple to generate an embedded vector corresponding to the first identifier.

In general, in one or more aspects, the disclosure relates to a system that includes a processor and a memory. The memory includes an application. The application executes on the processor, uses the memory, and is configured for collecting word-based data corresponding to a first identifier. A first phrase vector is generated for the first identifier by extracting frequency data from the word-based data. A similarity metric is generated corresponding to the first identifier and a second identifier by comparing the first phrase vector of the first identifier to a second phrase vector of the second identifier. A tuple is generated that includes the first identifier and the second identifier using the similarity metric. A machine learning model is trained with the tuple to generate an embedded vector corresponding to the first identifier.

In general, in one or more aspects, the disclosure relates to a method that includes collecting word-based data corresponding to a first identifier. A first phrase vector is generated for the first identifier by extracting frequency data from the word-based data. A tuple is generated that includes the first identifier and a second identifier using the first phrase vector. A machine learning model is trained with the tuple to generate an embedded vector corresponding to the first identifier. A set of embedded vectors is clustered to generate a cluster of embedded vectors including the embedded vector. A category is added to a set of categories when an additional category threshold is satisfied. A previous category is removed from the set of categories when a category removal threshold is satisfied.

Other aspects of the invention will be apparent from the following description and the appended claims.

DETAILED DESCRIPTION

Figure 1A:
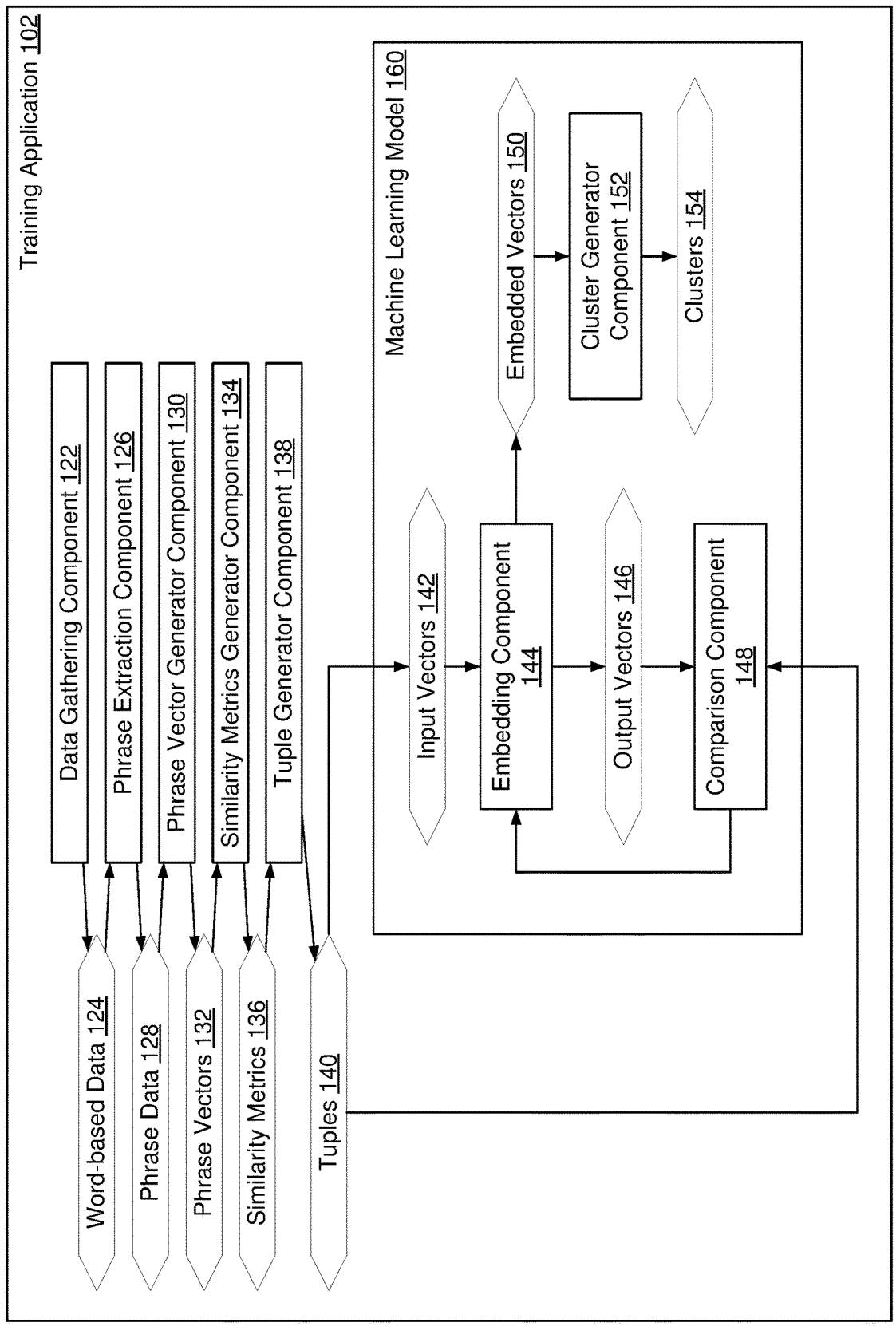
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure use unsupervised competition based encoding to generate embedded vectors. The embedded vectors may be used for clustering, categorizing, and providing recommendations. For example, clusters may be identified from a set of embedded vectors and the clusters may be categorized. Recommendations for an entity (e.g., a business or a person) may be identified based on which cluster and category are associated with the embedded vector that corresponds to the entity. The recommendations may include offers to an entity (e.g., a discounted interest rate) or insights about the entity (e.g., a below average days of inventory financial metric).

To generate the embedded vectors, word-based data is gathered that may include financial data corresponding to entities (e.g., businesses or people). As an example, the word-based data may include invoice items that identify the products and services sold by different businesses. Phrases and frequency data are extracted from the word based data. The phrases are groups of one or more words and the frequency data identifies how often the phrases occur in the word-based data. Phrase vectors are generated from the frequency data using similarity metrics. Tuples that identify similar entities are generated using the phrase vectors. The tuples are then used by the machine learning model to generate embedded vectors.

The embedded vectors represent corresponding entities, business, and people. The similarity between the embedded vectors represents the similarity between the entities, business, and people. Clusters and categories are generated from the embedded vectors to identify groups of similar entities, business, and people. The identification of similar entitles may be used to update the names of the categories or target ads, products, and services to the entities.

Figure 1B:
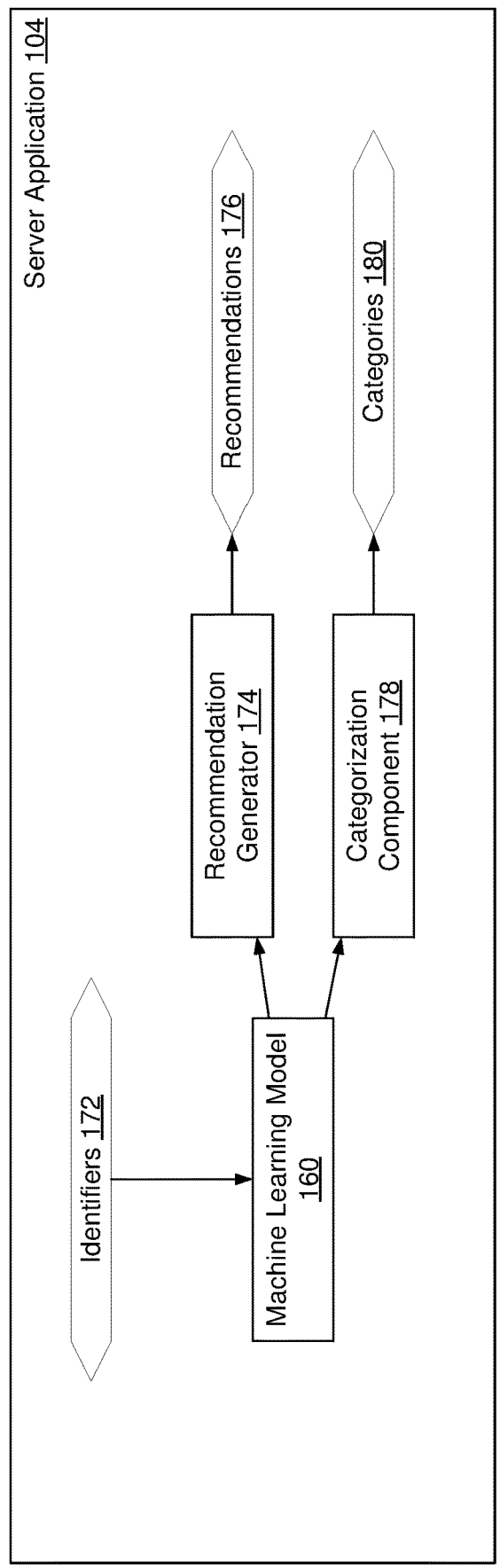
Figure 1C:
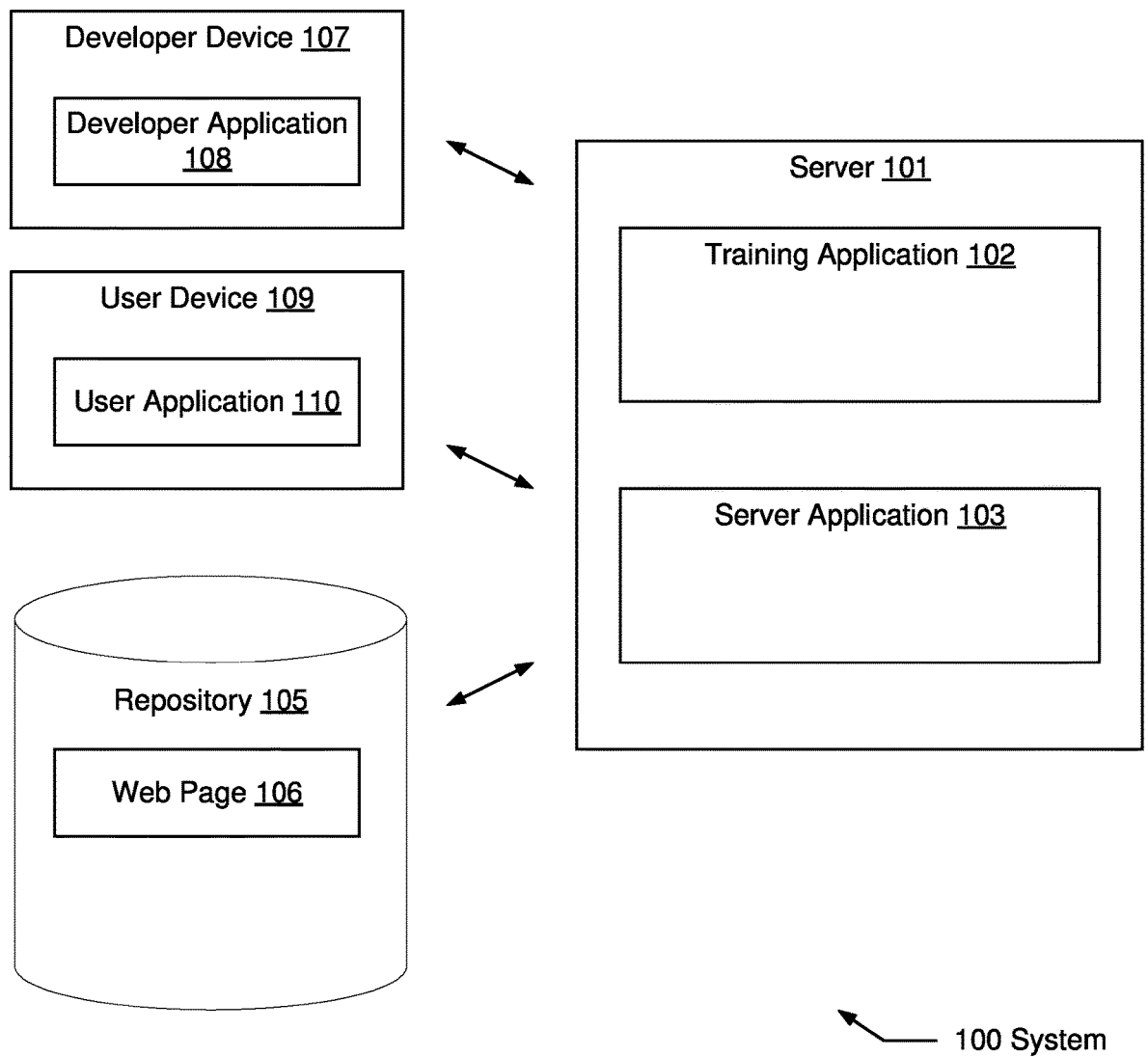

FIG. 1A, FIG. 1B, and FIG. 1C show diagrams of embodiments that are in accordance with the disclosure. FIG. 1A shows a training application (102), which trains machine learning models using unsupervised competition-based encoding. FIG. 1B shows a server application (104), which uses the embeddings learned with a machine learning model (160). FIG. 1C shows a system (100), which performs unsupervised competition-based encoding. The embodiments of FIG. 1A, FIG. 1B, and FIG. 1C may be combined and may include or be included within the features and embodiments described in the other figures of the application. The features and elements of FIG. 1A, FIG. 1B, and FIG. 1C are, individually and as a combination, improvements to the technology of machine learning. The various elements, systems, and components shown in FIG. 1A, FIG. 1B, and FIG. 1C may be omitted, repeated, combined, and/or altered as shown from FIG. 1A, FIG. 1B, and FIG. 1C. Accordingly, the scope of the present disclosure should not be considered limited to the specific arrangements shown in FIG. 1A, FIG. 1B, and FIG. 1C.

Turning to FIG. 1A, the training application (102) is a set of hardware and software modules and components that execute on a server (101) (of FIG. 1C). The training application (102) trains the machine learning model (160) to generate the embedded vectors (150) from the word-based data (124). The embedded vectors (150) are used to identify similar entities. Each of the entities being analyzed by the system is identified with an identifier that is unique to an individual entity. Example entities include businesses and people, which are identified with numbers or strings. The training application (102) includes a data gathering component (122), a phrase extraction component (126), a phrase vector generator component (130), a similarity metrics generator component (134), a tuple generator component (138), and the machine learning model (160).

The data gathering component (122) is a set of hardware and software modules and components that gather the word-based data (124) from one or more sources. As an example, the sources may include databases of financial institutions. The data gathering component (122) may use a set of rules to identify which data to gather from the sources. For example, a rule may indicate that invoice items for a predefined period of time (e.g., the most recent six months) are to be gathered to form the word-based data (124) used to train the machine learning model (160).

The word-based data (124) is a set of records related to an entity that includes information using words. The word-based data (124) may include records for multiple entities. Records that belong to a particular entity are identified with an identifier of the entity. The words in the records may be single distinct meaningful elements of speech or writing, which may be stored in the records as sequences of textual characters in accordance with one or more standards including the American Standard Code for Information Interchange (ASCII) standard, the Unicode standard, etc. The word-based data (124) may include words, numbers, dates, etc.

The phrase extraction component (126) is a set of hardware and software modules and components to extract phrase data (128) from the word-based data (124). The phrase extraction component (126) identifies phrases in the word-based data (124). A phrase is a collection of one or more words that appear in a single record within the word-based data. A phrase may also be referred to as an n-gram and the phrase extraction component (126) may include an n-gram length threshold that identifies a maximum number of words in an n-gram. The phrase extraction component (126) may ignore stop words, words that are too common (e.g., used by 10% or more of the population of entities), and normalize the words by stemming the words. As an example, punctuation and whitespace may be used to identify the location of words within the word-based data (124) and individual phrases may be associated with a word identifier (e.g., a positive integer) that uniquely identifies the phrase. Of the phrases identified from the word-based data (124), the phrase extraction component (126) may keep a threshold number (e.g., 100) of the most frequent phrases.

The phrase data (128) includes the individual phrases that are in the word-based data (124) for each of the entities being analyzed. A single phrase in the phrase data (128) may be used in the records of multiple entities and be associated with multiple identifiers for the entities.

The phrase vector generator component (130) is a set of hardware and software modules and components that generate phrase vectors (132) from the phrase data (128). The phrase vectors (132) are generated by extracting frequency data from the word-based data (124) using the phrase data (128) and organizing the frequency data to form the elements of the phrase vectors (132). The phrase vector generator component (130) may use one or multiple algorithms to generate the phrase vectors (132), including word frequency, word collocations and co-occurrences, a term frequency-inverse document frequency (TF-IDF), a rapid automatic keyword extraction (RAKE), etc. As an example, using the term frequency inverse document frequency, a document for an entity may include each of the records in the word-based data (124) associated with a particular identifier of an entity. The number of times a phrase appears in the document (the term frequency) is compared the rarity or commonness of the phrase over all of the records in the word-based data (124) (the inverse document frequency). In one variant of the term frequency inverse document frequency algorithm, the term frequency (tf) for the phrase (p) and the document (d) is calculated using the Equation 1 below, where ($f_{p,d}$) is the frequency of a phrase in a document and $\max\{f_{p',d}: p' \in d\}$ is the frequency of the phrase (p') with the highest frequency in the document (d).

$$tf(p, d) = 0.5 + 0.5 \cdot \frac{f_{p,d}}{\max\{f_{p',d}: p' \in d\}} \qquad \text{(Eq. 1)}$$

Further, the inverse document frequency (idf) for the phrase (p) and the corpus of all documents (D), i.e., all of the records in the word-based data (124) is calculated using the Equation 2 below, where the numerator (N) within the log function is the number of documents in the corpus (N=|D|) and the denominator is one plus the number of documents in the corpus (D) that include the phrase (p).

$$idf(p, D) = \log \frac{N}{1 + |\{d \in D: p \in d\}|} \qquad \text{(Eq. 2)}$$

The phrase vectors (132) identify the usage of the phrases from the phrase data (128) for the different entities being analyzed. One phrase vector may correspond to one entity. Each phrase vector may have a number of dimensions equal to the number of phrases in the phrase data (128). Each element of a phrase vector corresponds to a particular phrase from the phrase data (128). Each phrase may include one or more words. The values of the elements of a phrase vector may be normalized so that the sum of the element values of the phrase vector is equal to 1. In one embodiment, the value of an element of a phrase vector is the similarity metric for the corresponding phrase. A phrase vector may be linked to an identifier of a single entity in a one to one relationship.

The similarity metrics generator component (134) is a set of hardware and software modules and components that generates similarity metrics (136) between the identifiers of the entities using the phrase vectors (132). A number of the similarity metrics (136) may be used and combined to identify the similarity between the phrase vectors (132) of the identifiers of the entities. The similarity metrics (136)

include cosine similarity, Jaccard similarity, Euclidean distance, Manhattan distance, Minkowski distance, dot product, etc. Multiple similarity metrics may be weighted and combined to form a combined similarity metric. The similarity metrics generator component (134) may generate the similarity metrics (136) between each of the phrase vectors (132) or use a similarity calculation threshold. The similarity calculation threshold identifies the number or percentage (e.g., 25% of the number entities being analyzed) of randomly selected phrase vectors for which a similarity metric is generated for a given phrase vector. As an example, when there are 1,000 entities that are each assigned to a unique identifier and each have a phrase vector, the similarity metric may identify that each phrase vector will be compared to 100 (i.e., 10% of the total number of identifiers and entities) randomly selected other phrase vectors.

The similarity metrics (136) quantify the similarity between the phrase vectors (132). Each similarity metric may include a real floating point value that quantifies the similarity and is linked to two identifiers that correspond to the two phrase vectors used to generate the similarity metric.

$$\text{Jaccard similarity}(A,B) = \Sigma_i \min\{A_i, B_i\} / \Sigma_i \max\{A_i, B_i\} \quad \text{(Eq. 3)}$$

Equation 3 determines the Jacquard similarity (also referred to as a Jaccard index) between two phrase vectors (A and B). For each element in the vectors, the minimum from either the first phrase vector (A) or the second phrase (B) are summed (represented by $\Sigma_i \min\{A_i, B_i\}$) and the maximum values are summed (represented by $\Sigma_i \max\{A_i, B_i\}$). The sum of minimums is divided by the sum of maximums to generate the Jacquard similarity between the phrase vectors.

$$\text{cosine similarity}(A, B) = \frac{A \cdot B}{\|A\|\|B\|} = \frac{\sum_i (A_i \cdot B_i)}{\sqrt{\sum_i A_i^2 \sum_i B_i^2}} \quad \text{(Eq. 4)}$$

Equation 4 determines the cosine similarity between two phrase vectors (A and B). The dot product of the two phrase vectors (represented by A·B or, equivalently, $\Sigma_i(A_i \cdot B_1)$) is divided by the product of the magnitudes of the two phrase vectors (represented by $\|A\|\|B\|$ or, equivalently, $\sqrt{\Sigma_i A_i^2 \Sigma_i B_i^2}$) to generate the cosine similarity.

The tuple generator component (138) generates tuples (140) using the similarity metrics (136). For each identifier (i.e., for each entity) a number of tuples (140) may be generated. The tuple generator component (138) may use a tuple generation threshold to identify the number tuples (140) generated for each identifier. As an example, the tuple generation threshold may be 100 so that for each entity, up to 100 tuples (140) are generated. In addition to or in lieu of the tuple generation threshold, a minimum similarity threshold may be used, wherein when a similarity metric is above the minimum similarity threshold, then a tuple may be created using the identifiers of the phrase vectors (132) that generated the similarity metric. The minimum similarity threshold may be calculated as one or more standard deviations from the average value of the similarity metrics (136).

The tuples (140) identify entities that are similar by grouping the identifiers of the similar entities. As an example, a tuple may include two identifiers, a first identifier and a second identifier that each identify an entity.

A tuple may include more than two identifiers to indicate that multiple entities are similar. The tuples (140) may include positive tuples that include a first identifier and a set of multiple second identifiers that identify entities that are similar to the entity identified by the first identifier. The tuples (140) may also include negative tuples in which the set of multiple second identifiers identify entities that are not similar to the entity identified by the first identifier. In addition to identifiers, a tuple may include a similarity value to indicate the type of similarity between the first identifier and the second identifier(s). For example, with a positive tuple, the similarity value may be "1" and for a negative tuple the similarity value may be "0".

The machine learning model (160) is a set of hardware and software modules and components that generates the embedded vectors (150) from the tuples (140) using input vectors (142), an embedding component (144), output vectors (146), and a comparison component (148). The machine learning model (160) may include one machine learning model or a combination of multiple machine learning models, e.g., an embedding machine learning model, a clustering machine learning model, a combination of an embedding machine learning model and a clustering machine learning model, etc. In one embodiment, the machine learning model (160) uses the word2vec algorithm to generate the embedded vectors (150), which may be a first machine learning model. From the embedded vectors (150), the machine learning model (160) may generate the clusters (154) using a cluster generator component (152), which may be a second machine learning model.

The input vectors (142) are a set of vectors that uniquely identify the entities being analyzed. In one embodiment, an input vector is a one-hot vector (a single element is "1" with the remaining elements "0") with a number of dimensions equal to the number of entities. An element of an input vector that is "hot" (e.g., a "1") may correspond to the identifier of the entity when the identifier is a positive integer. The input vectors (142) are generated from the first identifiers from the tuples (140). For example, the business "Alice's Awesome Art" may be identified by the positive integer "2378" from a pool of 5000 entities so that the input vector representing "Alice's Awesome Art" is a 5000 element vector with the $2378^{th}$ element being "1" and the remaining 4999 elements being "0".

The embedding component (144) generates the output vectors (146) from the input vectors (142). In one embodiment, the embedding component (144) is a two layer fully connected neural network with the first layer weights corresponding to the embedded vectors (150).

The output vectors (146) include the same number of dimensions as the input vectors (142). The values in the elements of an output vector identifies the identifiers of the entities that are similar to the identifier that corresponds to the input vector used to generate the output vector. In one embodiment, the values may be floating point values that are greater than or equal to "0". Elements with larger values indicate that there is more similarity between the entity represented by the output vector element and the entity represented by the input vector that was used to generate the output vector.

The comparison component (148) compares the output vector with the second identifier from the tuple (140). In one embodiment, the output vector and the second identifier have the same number of dimensions and the comparison calculates the error between the output vector and the second identifier using an error function. The comparison component (148) backpropagates the error from the comparison to the weights of the neural network of the embedding component (144) to update the weights (which include the embedded vectors (150)) based on the error.

The embedded vectors (150) are the weights from the first layer of the neural network of the embedding component (144). Each of the embedded vectors (150) may have a number of dimensions (e.g., 100, 200, 500, etc.) that is fewer than the number of dimensions for the input vectors (142). For example, the first layer of the neural network may correspond to a matrix of weights with rows corresponding to the input vector dimensions (representing the entities) and columns corresponding to the embedded vector dimensions. A row from the matrix may be the embedded vector for an entity identified by an input vector. The input vectors (142) and the output vectors (146) are sparse representations of an entity and the embedded vectors (150) are a dense representation of the entity having fewer dimensions. The total number of input vectors may be the same as the total number of embedded vectors and each entity may correspond to one unique input vector and one embedded vector. The embedded vectors (150) corresponding to identifiers of entities that are similar will have similar values in the respective elements of the embedded vectors (150). The embedded vectors (150) may be updated each time an entity is added to or removed from the system.

The cluster generator component (152) generates the clusters (154) from the embedded vectors (150). Clustering algorithms that may be used by the cluster generator component (152) include K-means clustering, mean-shift clustering, density-based spatial clustering of applications with noise (DBSCAN), expectation-maximization (EM) clustering using gaussian mixture models (GMM), Agglomerative Hierarchical Clustering, etc.

Cluster generation may be limited by maximum number of clusters threshold. The maximum number of clusters threshold identifies the number of clusters the cluster generator component (152) generates. The maximum number of clusters threshold may use an integer value (e.g., 40).

The clusters (154) identify groups of similar embedded vectors. Each cluster may correspond to a category for the similar entities that are identified as part of a cluster. The clusters (154) may be updated each time an entity is added to or removed from the system.

Turning to FIG. 1B, the server application (104) is a set of hardware and software modules and components that execute on the server (101) (of FIG. 1C). The server application (104) generates recommendations (176) and the categories (180) from the identifiers (172) using the machine learning model (160). Recommendations may include offers and insights. Offers may include targeted ads, products, services, etc. that are presented to a user of the system. Insights may include an identification of a financial metric of one entity that diverges from the average value of the financial metric for a group of entities. For example, an insight may be that a days of inventory financial metric is below average compared to other businesses in the same cluster or category.

The identifiers (172) identify groups of data. Each of the identifiers (172) may correspond to a unique subset of the word-based data (124), one of the phrase vectors (132), a subset of the similarity metrics (136), a subset of the tuples (140), and one of the embedded vectors (150) from FIG. 1A. The identifiers (172) may be unique positive integers assigned to identify different entities being analyzed by the system.

A recommendation generator (174) generates the recommendations (176) that are based on the machine learning model (160) and the identifiers (172). As an example, in response to a request including a loan application, the recommendation generator (174) may identify a recommendation that is a discount based on similar entities identified with the machine learning model (160). As another example, in response to a request for a recommendation, the recommendation generator (174) may compare the financial metrics of the requesting entity to the same financial metrics of other entities in the same cluster and identify a recommendation that identifies a financial metric below the average for the entities in the cluster.

A categorization component (178) updates the categories (180) for the entities analyzed by the system. As an example, after training the machine learning model (160), an entity may have changed categories, new categories may be added, and old categories may be removed.

Turning to FIG. 1C, the system (100) is trained to perform unsupervised competition-based encoding using machine learning by generating the embedded vectors (150) (shown in FIG. 1A) from the word-based data (124) (shown in FIG. 1A). The system (100) includes the server (101), a repository (105), a developer device (107), and a user device (109). The server (101) may include the training application (102) and the server application (103).

The training application (102) is a program on the server (101). The training application (102) trains the machine learning models of the system (100), as further described in FIG. 1A. The training application (102) may be operated or controlled by the developer device (107) with a developer application (108).

The server application (103) is a program on the server (101). The server application (103) includes multiple programs and machine learning models used by the system (100) to interact with the user device (109), as further described in FIG. 1B.

Figure 4A:
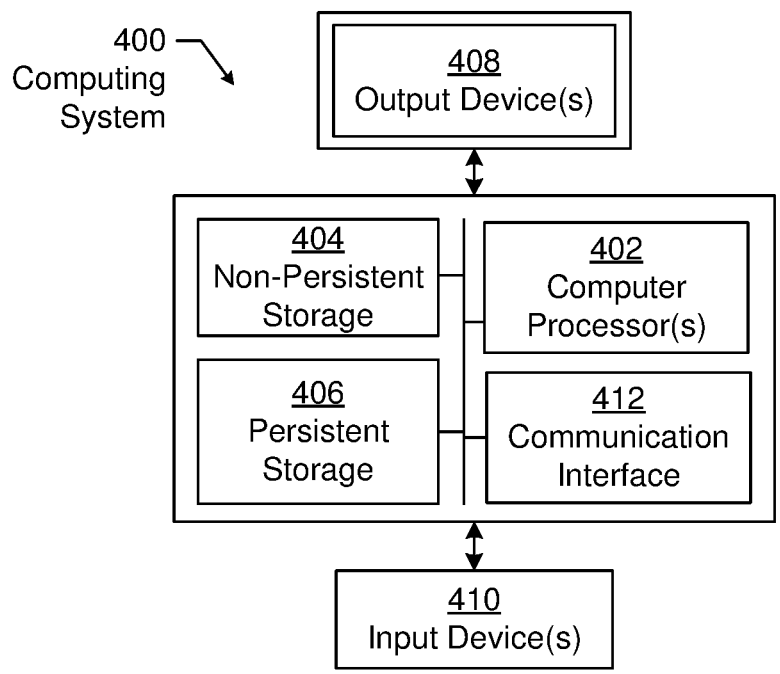
FIG. 4A and FIG. 4B show computing systems in accordance with disclosed embodiments.
Figure 4B:
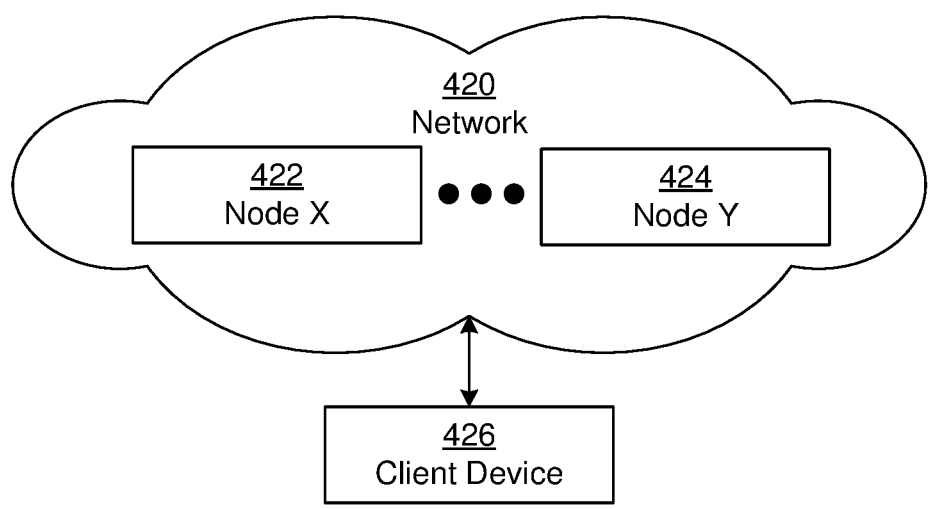

The server (101) is an embodiment of the computing system (400) and the nodes (422 and 424) of FIG. 4A and FIG. 4B. The server (101) may be one of a set of virtual machines hosted by a cloud services provider to deploy the training application (102) and the server application (103) for a web provider.

The repository (105) is a computing system that may include multiple computing devices in accordance with the computing system (400) and the nodes (422 and 424) described below in FIGS. 4A and 4B. The repository (105) may be hosted by a cloud services provider for the web provider. The cloud services provider may provide hosting, virtualization, and data storage services as well as other cloud services and the web provider may operate and control the data, programs, and applications that store and retrieve data from the repository (105). The data in the repository (105) may include (shown in FIG. 1A) the word-based data (124), the phrase data (128), the phrase vectors (132), the similarity metrics (136), the tuples (140), the input vectors (142), the output vectors (146), the embedded vectors (150), the clusters (154); and may include (shown in FIG. 1B) the identifiers (172), the recommendations (176), and the categories (180).

The data in the repository (105) may also include a web page (106) that is part of a website hosted by the system (100) with which the users and the developers interact using the user device (109) and the developer device (107) to access the machine learning model (160) of FIG. 1A, the training application (102), and the server application (103).

The developer device (107) is an embodiment of the computing system (400) and the nodes (422 and 424) of FIG. 4A and FIG. 4B. The developer device (107) includes the developer application (108) for accessing the training application (102). The developer application (108) may include a graphical user interface for interacting with the training application (102) to control training of the machine learning models of the system (100).

The user device (109) is an embodiment of the computing system (400) and the nodes (422 and 424) of FIG. 4A and FIG. 4B. The user device (109) is used to access the web page (106) of the website hosted by the system (100). The user device (109) includes the user application (110) for accessing the server application (103). The user application (110) may include multiple interfaces (e.g., a graphical user interface, a voice interface, etc.) for interacting with the server application (103). A user may operate the user application (110) to perform tasks with the server application (103) to interact with the system (100). The results may be presented by being displayed by the user device (109) in the user application (110). The user of the user device (109) may be a customer of the web provider.

The developer application (108) and the user application (110) may be web browsers that access the training application (102) and the server application (103) using web pages hosted by the server (101). The developer application (108) and the user application (110) may additionally be web services that communicate with the training application (102) and the server application (103) using representational state transfer application programming interfaces (RESTful APIs). Although FIG. 1C shows a client server architecture, one or more parts of the training application (102) and the server application (103) may be local applications on the developer device (107) and the user device (109) without departing from the scope of the disclosure.

Figure 2:
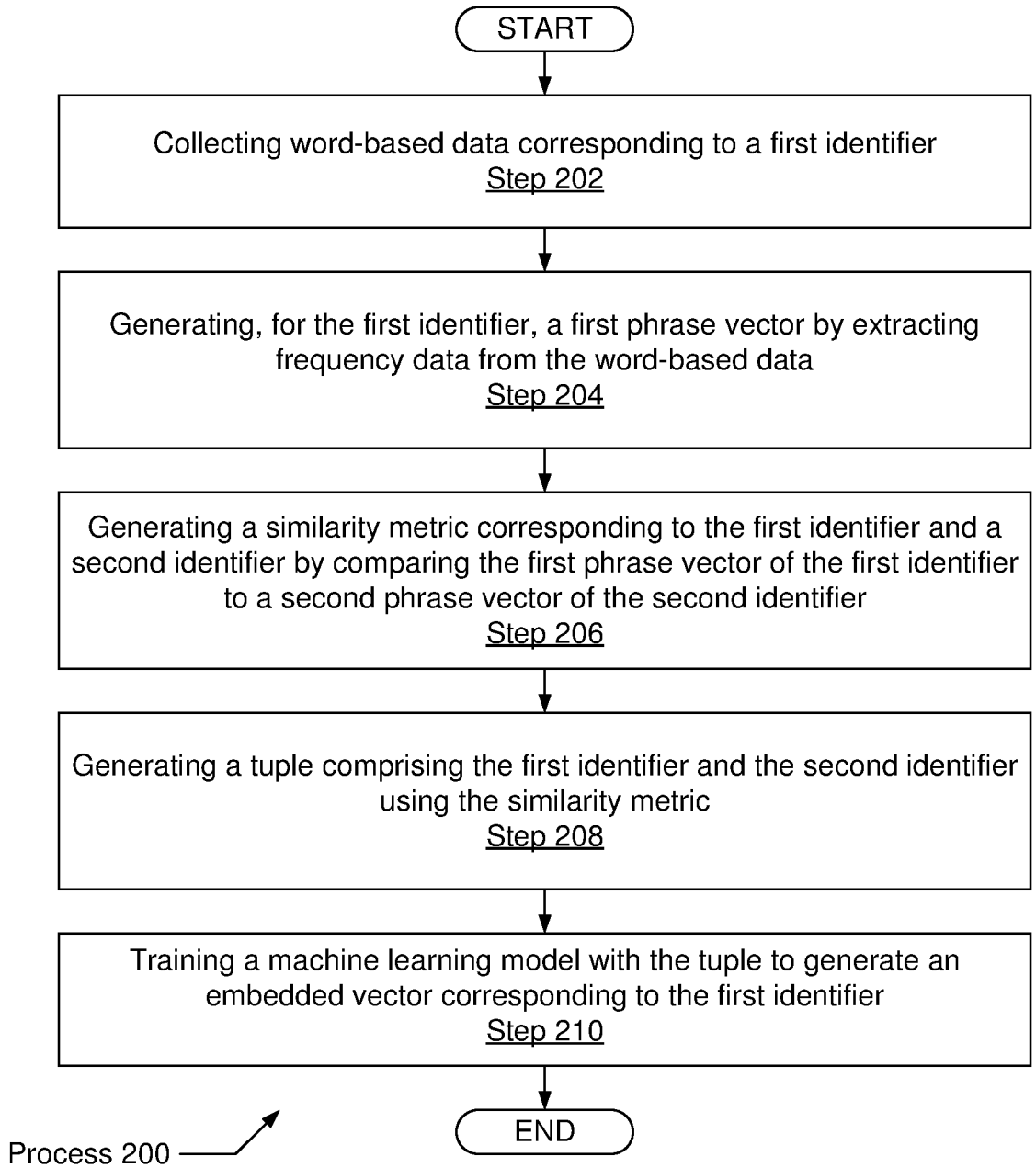
FIG. 2 shows a flowchart in accordance with disclosed embodiments.

FIG. 2 shows a flowchart of the process (200) in accordance with the disclosure. The process (200) of FIG. 2 uses machine learning models to perform unsupervised competition-based encoding using machine learning by generating the embedded vectors from the word-based data. The embodiment of FIG. 2 may be combined and may include or be included within the features and embodiments described in the other figures of the application. The features of FIG. 2 are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

In Step 202, word-based data is collected that corresponds to identifiers. Each item of the word-based data corresponds to one identifier and one identifier may correspond to multiple items in the word-based data. The word-based data may be collected by retrieving the word-based data from a repository of financial data that includes invoice records, financial document records, etc. The word-based data may also be collected by scraping data from third party websites.

Collection of the word-based data may utilize rules to specify the data to collect. For example, a rule may use a collection date threshold (e.g., three months, six months, twelve months, etc.) specifying that the collected data was generated between the current date and the date specified by the collection date threshold (e.g., within the last six months). The word-based data may be collected by identifying the rules for the word-based data and retrieving the word based data from a repository using the rules. A rule may identify a type of record for the word-based data (e.g., invoice items, financial records, tax statements, etc.)

In Step 204, phrase vectors are generated for the identifiers by extracting frequency data from the word-based data. The frequency data may be extracted using multiple algorithms, including word frequency, word collocations and co-occurrences, term frequency-inverse document frequency (TF-IDF), rapid automatic keyword extraction (RAKE), etc. After identifying frequency information for each phrase in the word-based data, a phrase vector is generated from the frequency data. The phrase vector includes an element for each phrase and the value of an element is the frequency data for the phrase corresponding to the element. In one embodiment, the phrase vectors are generated by: generating n-grams, identifying frequency data, and combining parts of the frequency data into the phrase elements of the phrase vectors. An n-gram is a contiguous sequence of n items from a portion of the word-based data. The items forming the n-gram may be phonemes, syllables, letters, words, base pairs, etc. After identifying the n-grams in the word-based data, a frequency analysis may be performed.

The phrase frequency (also referred to as the term frequency from TF-IDF analysis) may be identified for each of the n-grams. An inverse record frequency (also referred to as the inverse document frequency) may also be identified.

In one embodiment, the phrase frequency is determined with respect to a record from the word-based data. As an example, the word-based data may include detailed financial documents and the phrase frequency is determined with respect to each of the financial documents. In one embodiment, the phrase frequency for a record the number of times the n-gram appears in the record divided by the total number of n-grams in the record.

In one embodiment, the record for determining the phrase frequency may be a collection of invoice items that correspond to a single identifier. As an example, the word-based data as a whole may include millions of invoice items with each invoice item corresponding to one of several thousands of identifiers. The phrase frequency may be calculated over the subset of invoice items that correspond to a single identifier, which may be referred to as a record or collection of invoice items of an identifier.

The inverse record frequency may be identified over the set of records. In one embodiment, the inverse record frequency may be the total number of records divided by the number of records that include the n-gram.

Parts of frequency data are combined to generate phrase elements that form the phrase vectors. As an example, for a phrase vector of one identifier, the phrase frequency of an n-gram may be multiplied with the inverse record frequency of the n-gram to generate a phase element, which is incorporated as one of the elements of the phrase vector.

In Step 206, similarity metrics are generated that correspond to the identifiers by comparing the phrase vectors of the identifiers. Similarity metrics may be generated for each pair of identifiers using the corresponding phrase vectors. In one embodiment, a limited number of similarity metrics are generated for each identifier. A similarity metric is generated by selecting two identifiers and comparing the phrase vectors that correspond to the identifiers using a similarity function. Similarity functions include cosine similarity, Jaccard similarity, Euclidean distance, Manhattan distance, Minkowski distance, dot product, etc. In one embodiment, the similarity metric is generated as a Jaccard index calculated between a first phrase vector and a second phrase vector using Equation 3 from above.

In Step 208, tuples are generated using the similarity metrics. A tuple includes a first identifier corresponding to a first phrase vector and a set of one or more second identifiers with each second identifier corresponding to a different identifier. For example, the tuple "(10188, 8209)" may indicate that the entity identified by the first identifier 10188 is similar to the entity identified by the second identifier 8209. The similarity between the two entities may be determined by the similarity metric meeting a similarity threshold. As another example, the tuple "(20893, 32986, 7289)" may indicate that the entity identified by the first identifier 20893 is similar to each of the entities identified by the second identifiers 32986 and 7289. The number of tuples generated may be controlled using one or more thresholds.

A tuple generation threshold may be used to limit the number of tuples generated for each identifier. For example, with a tuple generation threshold of 50, up to 50 tuples may be generated for each identifier.

A minimum similarity threshold may be used to limit the number of tuples using the similarity metric. As an example, with a minimum similarity threshold of a fixed number (e.g., 0.9 with 1.0 or perfect similarity or duplicate items and 0 for items with no similarity), tuples may be generated for each similarity metric the satisfies the threshold by being equal to or above the fixed number.

Generating the tuples may include generating a tuple as a positive tuple when the similarity metric satisfies a similarity threshold. Additionally, generating the tuples may include generating the tuple as a negative tuple when the similarity metric does not satisfy a similarity threshold. A positive similarity threshold may be used for positive tuples that is different from a negative similarity threshold used for negative tuples. As an example, the positive similarity threshold may be 0.68 or one standard deviation above the average and the negative similarity threshold may be 0.32 or one standard deviation below the average. Using similarity thresholds may lead to generating a variable number of tuples.

A positive tuple may be distinguished from a negative tuple by including a similarity value in the tuple. For example, in the tuple "(10188, 8209, 1)", the "1" is a similarity value (or label) indicating that the tuple is positive tuple and that the entities represented by the identifiers 10188 and 8209 are similar. In the tuple "(20893, 32986, 7289, 0)", the "0" is a similarity value indicating that the tuple is a negative tuple and that the entity represented by the first identifier 20893 is different from, or not similar to, the entities represented by the second identifiers 32986 and 7289.

In one embodiment, the similarity threshold may limit the number of similar companies. For example, instead of limiting by the value of the similarity metric, the similarity threshold may identify the number (e.g., the top 50, 75, 100, etc.) of second entities identified with second identifiers that are similar to a first entity identified with a first identifier.

In Step 210, a machine learning model is trained with the tuples to generate embedded vectors that correspond to the identifiers. The machine learning model may use the word2vec algorithm to generate the embedded vectors. To train the machine learning model, a first identifier is retrieved from a tuple. The first identifier is converted to an input vector. The input vector is input to a two layer neural network model to generate an output vector. The output vector is compared with a second identifier from the tuple to identify an amount error in the output vector. The error is backpropagated through the neural network to update the weights of the neural network. The weights of the first layer of the neural network may be extracted from the neural network and form the embedded vectors.

In one embodiment, the machine learning model is trained by assigning a first identification vector to the first identifier and a second identification vector to the second identifier. The identification vector is input to the machine learning model to generate an output vector. The output vector is compared to the second identification vector to update a weight of the machine learning model. The embedded vector is formed with the weight. The weight may be part of a weight matrix used to generate the output vector from the input vector.

In one embodiment, the machine learning model may include clustering the embedded vectors to generate clusters of embedded vectors. In one embodiment, the clustering is performed using the K-means clustering algorithm to identify clusters for the embedded vectors.

In one embodiment, after clustering the embedded vectors, a financial metric may be calculated with the cluster of embedded vectors. The financial metric may identify an ability to repay a loan, a repayment risk, a credit risk, an exposure, a loss rate of comparable companies, etc. An offer may be presented based on the financial ratio. The financial metric may be an aggregated value (e.g., an average) that is calculated for the companies within a cluster. In response to a user request, an offer may be generated and presented that includes targeted ads, discounts (to interest rates, principal amounts, etc.), product recommendations, etc. For example, an average repayment risk may be calculated for the cluster to which an entity belongs. The cluster average repayment risk may be lower than the overall average repayment risk leading to a proportionally larger discount (i.e., a lower interest rate) being presented for a loan.

In one embodiment, after clustering the embedded vectors, a financial ratio may be calculated with the cluster of embedded vectors. For example, the financial ratio may include liquidity ratios, solvency ratios, profitability ratios, efficiency ratios, coverage ratios, market prospect ratios of comparable companies, etc. An insight based on the financial ratio may be presented. For example, in response to a user request, an insight may be identified and presented that includes identifying a ratio for a company that is below average for the cluster of similar companies.

In one embodiment, after clustering the embedded vectors, a cluster of embedded vectors is categorized to form a category identifying a type of business of the cluster and the first identifier. The first identifier may have been previously in a different cluster and a different category. After identifying the cluster and category for an identifier of an entity, the category maybe presented in response t a request from a user of the system.

The categorization may include adding a category to a set of categories when an additional category threshold is satisfied. The additional category threshold may identify an error value that is the maximum allowed error between an embedded vector and a cluster. When at least one embedded vector does not satisfy the error value, the additional category threshold is triggered and an additional category may be included and the clusters and categories recalculated.

The categorization may also include removing a previous category from the set of categories when a category removal threshold is satisfied. The removal threshold may identify a minimum number of embedded vectors for a cluster and category. If a category or cluster does not include the minimum number of embedded vectors, then the category or cluster may be removed.

The table below provides an example of word-based data that includes descriptions from invoice items:

TABLE 1

Pool cleaning
Pool chlorination
Gardening
John Wayne style haircut
2PCS Powerful Sink Drain Cleaner Powder
2.4 M Long Sewer Cleaning Wire Spring
Wall painting
Bluebonnet Nutrition Simply Energy Powder, Strawberry Kiwi, 10.58 Ounce The phrases in the following table may be identified from the word-based data from the previous table.

TABLE 2

| | |
|---|---|
| Pool | Pool cleaning |
| Pool chlorination | Gardening |
| Haircut | Cleaner powder |
| Sink drain cleaner | Cleaning wire |
| Cleaning | Painting |
| Powder | |

The following table show frequency data obtained from word-based data with the phrases above. The count is the number of times a phrase occurs in the word-based data (124) and the frequency is the count of a phrase divided by the sum of all counts.

TABLE 3

| Phrase | Count | Frequency |
|---|---|---|
| Pool | 14,432 | 0.0370 |
| Pool cleaning | 8,653 | 0.0222 |
| Pool chlorination | 6,542 | 0.0168 |
| Gardening | 12,955 | 0.0332 |
| Haircut | 65,043 | 0.1669 |
| Cleaner powder | 34,094 | 0.0875 |
| Sink drain cleaner | 23,652 | 0.0607 |
| Cleaning wire | 22,321 | 0.0572 |
| Cleaning | 79,655 | 0.2044 |
| Painting | 65,776 | 0.1687 |
| Powder | 56,668 | 0.1454 |

The following table shows example phrase vectors generated from frequency data. The example vectors include eleven elements and may be expanded to include hundreds or thousands of elements based on the number of phrases identified from the word-based data. Three vectors are included for the entities identified as "Dayna", "Bill", and "Barak". The entities may be small businesses or people.

TABLE 4

| Phrase | Element | Dayna | Bill | Barak |
|---|---|---|---|---|
| Pool | 0 | 0.1 | 0 | 0 |
| Pool cleaning | 1 | 0.05 | 0 | 0 |
| Pool chlorination | 2 | 0.05 | 0 | 0 |
| Gardening | 3 | 0 | 0 | 0.3 |
| Haircut | 4 | 0 | 0.7 | 0 |
| Cleaner powder | 5 | 0.2 | 0 | 0 |
| Sink drain cleaner | 6 | 0 | 0 | 0.3 |
| Cleaning wire | 7 | 0 | 0 | 0.1 |
| Cleaning | 8 | 0.4 | 0 | 0.3 |

TABLE 4-continued

| Phrase | Element | Dayna | Bill | Barak |
|---|---|---|---|---|
| Painting | 9 | 0.1 | 0.3 | 0 |
| Powder | 10 | 0.1 | 0 | 0 |

The table below shows the cosine and Jaccard similarity metrics calculated between the entities "Dayna", "Bill", and "Barak". A single similarity metric may be selected or the similarity metrics may be weighted and combined. From the values in the table below, "Dayna" is more similar to "Barak" than to "Bill" and "Barak" and "Bill" are more similar to "Dayna" than to each other.

TABLE 5

| Identifiers | Cosine Similarity | Jaccard Similarity |
|---|---|---|
| Dayna, Bill | 0.0241 | 0.0526 |
| Dayna, Barak | 0.1184 | 0.1765 |
| Barak, Bill | 0 | 0 |

When a minimum similarity threshold for the cosine similarity is 0.1, the cosine similarity metric for Dayna and Barak satisfy the threshold and a tuple is generated that includes the identifiers for Dayna and Barak (e.g., "(Dayna, Barak)"). The other tuples for Dayna and Bill and for Barak and Bill do not satisfy the threshold and corresponding tuples may not be generated.

Figure 3A:
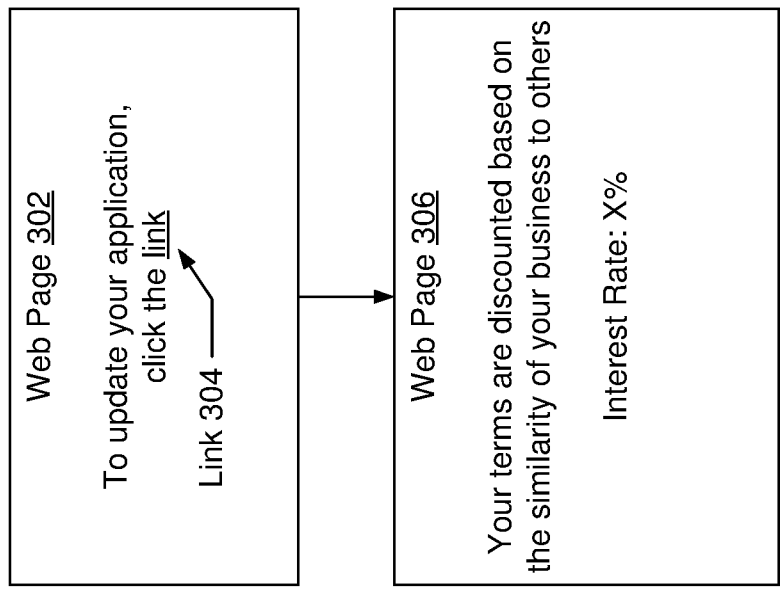
FIG. 3A and FIG. 3B show examples in accordance with disclosed embodiments.
Figure 3B:
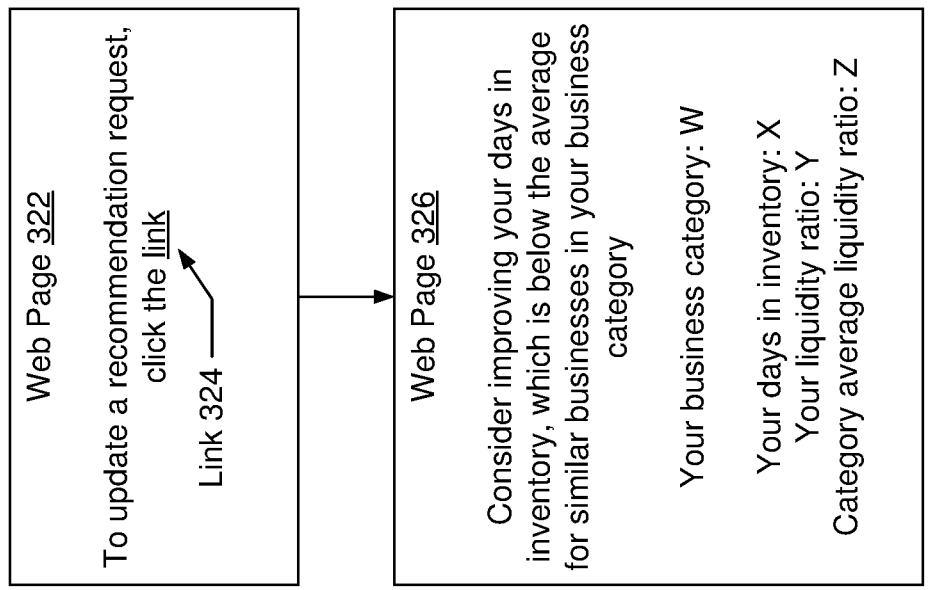

FIG. 3A and FIG. 3B show an example of systems and interfaces in accordance with the disclosure. FIG. 3A shows an example of using the machine learning model to generate a financial metric to determine and present an offer. FIG. 3B shows an example of using the machine learning model to generate financial ratios to determine and present an insight. The embodiments of FIG. 3A and FIG. 3B may be combined and may include or be included within the features and embodiments described in the other figures of the application. The features and elements of FIG. 3A and FIG. 3B are, individually and as a combination, improvements to the technology of computing systems and machine learning systems. The various features, elements, widgets, components, and interfaces shown in FIG. 3A and FIG. 3B may be omitted, repeated, combined, and/or altered as shown. Accordingly, the scope of the present disclosure should not be considered limited to the specific arrangements shown in FIG. 3A and FIG. 3B.

Turning to FIG. 3A, a web page (302) may be displayed on a user device. In response to selecting a link (304), a request may be sent to a server to update an application for a loan. In response to the request, the server may update the machine learning model of a group of businesses that includes the business for which the application was updated.

After updating the machine learning model, the server identifies similar businesses using the clusters generated with the embedded vectors from the updated machine learning model. With the clusters, the server may identify financial metrics (ability to repay a loan, repayment risk, credit risk, exposure, loss rate of comparable companies, etc.) for the group of businesses in the same cluster as the business for which the loan was applied.

An offer is generated using the financial metric. For example, the loan repayment risk for the cluster of similar companies may be compared to the industry average. When the risk is lower for the cluster and for the business, then the offer may include a discounted rate interest rate.

After determining the offer in response to selection of the link (304), a web page (306) is displayed. The web page (306) indicates that a discount was applied and shows the interest rate.

Turning to FIG. 3B, a web page (322) may be displayed on a user device. In response to selecting a link (324), a request may be sent to a server to update a recommendation request. In response to the request, the server may update the machine learning model of a group of businesses that includes the business for which the recommendation is being made.

After updating the machine learning model, the server identifies similar businesses using the clusters generated with the embedded vectors from the updated machine learning model. The categories may also be updated based on the updated clusters. With the clusters and categories, the server may identify financial ratios (liquidity ratios, solvency ratios, profitability ratios, efficiency ratios, coverage ratios, market prospect ratios of comparable companies, etc.) for the group of businesses in the same cluster and category as the business for which the recommendation was requested.

An insight is generated using a financial ratio. Several ratios may be determined for the for the cluster of similar businesses that includes the business requesting the recommendation. The server may identify the ratio that is furthest below the average the similar businesses. For example, the server may analyze liquidity ratios, solvency ratios, profitability ratios, efficiency ratios, coverage ratios, market prospect ratios, and days of inventory and determine that the days of inventory is the furthest below average.

After financial ratio for the insight, in response to selection of the link (324), a web page (326) is displayed. The web page (326) identifies the category of the business, presents multiple financial ratios ("days in inventory" and "liquidity ratio") for the business, a financial ratio ("category average liquidity ratio) for similar businesses in the same category and provides the insight that the business may consider improving the days in inventory.

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and 408) may be locally or remotely connected to the computer processor(s) (402), non-persistent storage (404), and persistent storage (406). Many different types of computing systems exist, and the aforementioned input and output device(s) (410 and 408) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   collecting word-based data corresponding to a first identifier;
   generating, by a phrase vector generator component and for the first identifier, a first phrase vector with frequency data extracted from the word-based data, wherein generating the first phrase vector comprises generating an n-gram, identifying frequency data and an inverse record frequency of the n-gram, and combining a phrase frequency and the inverse record frequency;
   generating, by a similarity metrics generator component, a similarity metric corresponding to the first identifier and a second identifier by comparing the first phrase vector of the first identifier to a second phrase vector of the second identifier;
   generating, by a tuple generator component, a tuple comprising the first identifier and the second identifier using the similarity metric; and
   training a machine learning model with the tuple to generate an embedded vector corresponding to the first identifier, wherein a financial metric is calculated with a cluster of embedded vectors including the embedded vector, and an offer generated using the financial metric is presented to a user device.

2. The method of claim 1, wherein collecting the word-based data comprises:
   identifying a rule for the word-based data,
      wherein the rule identifies invoice items of a predefined period of time as the word-based data; and
   retrieving the word-based data from a repository using the rule.

3. The method of claim 1, wherein generating the first phrase vector comprises:
generating the n-gram from the word-based data;
identifying the frequency data comprising the phrase frequency of the n-gram and the inverse record frequency of the n-gram; and
combining the phrase frequency and the inverse record frequency to form a phrase element, the phrase element comprised by the first phrase vector, and the phrase element corresponding to the n-gram.

4. The method of claim 1, wherein generating the similarity metric comprises:
generating the similarity metric as a Jaccard index calculated between the first phrase vector and the second phrase vector.

5. The method of claim 1, wherein the tuple comprises a similarity value based on whether the similarity metric satisfies a similarity threshold.

6. The method of claim 1, wherein training the machine learning model comprises:
assigning a first identification vector to the first identifier and a second identification vector to the second identifier;
inputting the first identification vector to the machine learning model to generate an output vector;
comparing the output vector to the second identification vector to update a weight of the machine learning model; and
forming the embedded vector with the weight.

7. The method of claim 1, further comprising:
clustering a set of embedded vectors to generate the cluster of embedded vectors including the embedded vector;
calculating the financial metric with the cluster of embedded vectors; and
presenting the offer based on a financial ratio.

8. The method of claim 1, further comprising:
clustering a set of embedded vectors to generate a cluster of embedded vectors including the embedded vector;
calculating a financial ratio with the cluster of embedded vectors; and
presenting an insight based on the financial ratio.

9. The method of claim 1, further comprising:
clustering a set of embedded vectors to generate a cluster of embedded vectors including the embedded vector;
categorizing the cluster of embedded vectors to form a category identifying a type of business of the cluster and the first identifier, wherein the first identifier was previously in a different cluster and a different category; and
presenting the category.

10. The method of claim 1, further comprising:
clustering a set of embedded vectors to generate a cluster of embedded vectors including the embedded vector;
adding a category corresponding to the cluster of embedded vectors to a set of categories when an additional category threshold is satisfied;
removing a previous category from the set of categories when a category removal threshold is satisfied; and
presenting the category.

11. A system comprising:
a processor;
a memory; and
the memory comprising an application, wherein the application executes on the processor, uses the memory, and is configured for:
collecting word-based data corresponding to a first identifier;
generating, by a phrase vector generator component and for the first identifier, a first phrase vector with frequency data extracted from the word-based data, wherein generating the first phrase vector comprises generating an n-gram, identifying frequency data and an inverse record frequency of the n-gram, and combining a phrase frequency and the inverse record frequency;
generating, by a similarity metrics generator component, a similarity metric corresponding to the first identifier and a second identifier by comparing the first phrase vector of the first identifier to a second phrase vector of the second identifier;
generating, by a tuple generator component, a tuple comprising the first identifier and the second identifier using the similarity metric; and
training a machine learning model with the tuple to generate an embedded vector corresponding to the first identifier, wherein a financial metric is calculated with a cluster of embedded vectors including the embedded vector, and an offer generated using the financial metric is presented to a user device.

12. The system of claim 11, wherein collecting the word-based data comprises:
identifying a rule for the word-based data,
wherein the rule identifies invoice items of a predefined period of time as the word-based data; and
retrieving the word-based data from a repository using the rule.

13. The system of claim 11, wherein generating the first phrase vector comprises:
generating the n-gram from the word-based data;
identifying the frequency data comprising the phrase frequency of the n-gram and the inverse record frequency of the n-gram; and
combining the phrase frequency and the inverse record frequency to form a phrase element, the phrase element comprised by the first phrase vector, and the phrase element corresponding to the n-gram.

14. The system of claim 11, wherein generating the similarity metric comprises:
generating the similarity metric as a Jaccard index calculated between the first phrase vector and the second phrase vector.

15. The system of claim 11, wherein the tuple comprises a similarity value based on whether the similarity metric satisfies a similarity threshold.

16. The system of claim 11, wherein training the machine learning model comprises:
assigning a first identification vector to the first identifier and a second identification vector to the second identifier;
inputting the first identification vector to the machine learning model to generate an output vector;
comparing the output vector to the second identification vector to update a weight of the machine learning model; and
forming the embedded vector with the weight.

17. The system of claim 11, wherein the application is further configured for:
clustering a set of embedded vectors to generate the cluster of embedded vectors including the embedded vector;
calculating the financial metric with the cluster of embedded vectors; and presenting the offer based on a financial ratio.

18. The system of claim 11, wherein the application is further configured for:
- clustering a set of embedded vectors to generate a cluster of embedded vectors including the embedded vector;
- calculating a financial ratio with the cluster of embedded vectors; and
- presenting an insight based on the financial ratio.

19. The system of claim 11, wherein the application is further configured for:
- clustering a set of embedded vectors to generate a cluster of embedded vectors including the embedded vector;
- categorizing the cluster of embedded vectors to form a category identifying a type of business of the cluster and the first identifier, wherein the first identifier was previously in a different cluster and a different category; and
- presenting the category.

* * * * *